United States Patent [19]

Vicari

[11] 4,395,168
[45] Jul. 26, 1983

[54] MULTIPLE CUTTER ROTARY TOOL

[76] Inventor: Frank Vicari, 249 Conklin St., Farmingdale, N.Y. 11735

[21] Appl. No.: 218,397

[22] Filed: Dec. 19, 1980

[51] Int. Cl.³ .............................................. B27C 3/00
[52] U.S. Cl. ...................... 408/20; 408/21; 408/26; 408/224; 407/35; 407/43; 144/230; 144/236
[58] Field of Search ............... 408/224, 225, 190, 193, 408/20–26; 407/31, 35, 43; 144/235, 236, 237, 218, 219, 230

[56] References Cited

U.S. PATENT DOCUMENTS

| | | | |
|---|---|---|---|
| 686,548 | 11/1901 | Seymour | 144/218 |
| 834,299 | 10/1906 | Heckel . | |
| 1,068,361 | 7/1913 | Olver | 144/230 |
| 1,237,064 | 8/1917 | Kunitz | 408/190 |
| 1,410,350 | 3/1922 | Smith et al. . | |
| 1,642,372 | 9/1927 | Kernats | 144/219 |
| 1,664,806 | 4/1928 | Betterley . | |
| 2,690,610 | 10/1954 | Begle et al. | 29/105 |
| 2,731,990 | 1/1956 | Cerkleski | 144/218 |
| 2,805,695 | 9/1957 | Hoheisel | 144/219 |
| 2,814,320 | 11/1957 | Dukes et al. | 144/228 |
| 3,142,111 | 7/1964 | Turner | 29/105 |
| 3,490,118 | 1/1970 | Corti | 144/236 |
| 3,830,269 | 8/1974 | Morse | 144/230 |
| 4,009,742 | 3/1977 | Ziegelmeyer | 144/230 |
| 4,009,837 | 3/1977 | Schnyder | 241/93 |

FOREIGN PATENT DOCUMENTS 206634 12/1959 Austria .............................. 144/218

*Primary Examiner*—Leonidas Vlachos
*Attorney, Agent, or Firm*—Nolte and Nolte

[57] ABSTRACT

A tool for use with a rotary drive is provided with a number of differently formed slots therein to receive different cutting blades in various orientations. The tool is adaptable for cutting in a radial direction and in an axial direction and can accommodate molding head cutters as well as standard ¼-inch tool steel bits in various combinations with spacer bars to provide different cutting profiles in a radial direction and to permit surface boring and milling in the axial direction.

19 Claims, 6 Drawing Figures

MULTIPLE CUTTER ROTARY TOOL

BACKGROUND OF THE INVENTION

The present invention relates to rotary cutting tools and specifically to the class of rotary cutting tools which have removable or replaceable blades mounted in a unitary body member.

There are many different kinds of rotary cutters such as dado heads, milling heads, surface planers, molding heads and the like. Typically this type of rotary cutter is adapted to permit changing of the blades, either to present a different molding configuration or to replace worn blades with newly sharpened ones. Nevertheless, these existing tools are intended for use in a single orientation in regard to the workpiece. Thus, when attempting to bore a hole or mill a surface, an entirely different tool must be employed than the one used to cut a molding profile. Some tools have movable bits, such as fly cutters, but is is difficult to firmly affix such bits in the tool. The possibility of the bit becoming loosened during working must be considered, and loosened bits can ruin the workpiece.

SUMMARY OF THE INVENTION

The present invention provides a unitary tool bit holder or body having a number of slots and grooves formed therein so as to permit various tool bits to be retained in the body, thereby to provide a cutting function in both a radial and an axial direction in relation to the axis of rotation of the tool. For example, molding cutters may be inserted and secured in the appropriate slots, the tool rotated against the workpiece, and molding profiles cut; tool bits may be affixed and secured in angularly arranged radial slots, the tool rotated and brought into contact with the workpiece, and the surface of the workpiece planed smooth or going further in circular grooves bored the workpiece; and multiple tool bits may be affixed and secured in the appropriate grooves, the tool rotated in contact with the workpiece and grooves or profiles cut into the workpiece.

These multiple cutting orientations are achieved by the present invention in part by the use of specialized holding members which hold the various tool bits captive in the unitary tool body.

In regard to the axial cutting orientation, the radial slots are angularly arranged in relation to the axis of the tool and retaining plates are used so that the tool bits may be retained at any point along the radial length of the slot. Thus, when functioning as a planer the surface of the workpiece can possibly be planed in a single pass. Additionally, the diameter of a hole being bored may be controlled. Also, if it is desired to bore a blind hole, each tool bit can be set at different points along the slot so as to cut multiple grooves which make it easier to clean the inner part of the bore at the conclusion of the cutting operation. Similarly, by adjusting the extent to which the tool bit protrudes from the bottom of the tool body, then during the axial cutting operation the depth of a groove may be accurately controlled. An assembly to hold a pilot bit for centering the tool during the boring operation is also provided.

In addition, other slots or grooves are formed within the tool body to accept a multiple of tool bits and spacers. This assembly of bits and spacers is retained by a retaining plate. In this manner various profiles, such as dovetails and the like, may be cut depending upon the particular arrangement of the tool bits and spacers.

Finally, provision is made for securing commercially available molding cutter blades in the unitary body and thus permitting the tool to be used to cut molding profiles.

Therefore, it is an object of the present invention to provide a rotary cutting tool having provision for accepting a multiple of different kinds of cutters, so as to provide a cutting and/or shaping action in a radial direction and a boring, grooving, milling or planing action in an axial direction.

It is another object of the present invention to provide a rotary cutting tool, wherein the tool bits are adjustable in relation to the body of the tool so as to accurately control the size, i.e., depth and diameter of the cut being made.

It is still a further object of the present invention to provide a rotary cutting tool wherein radial slots are provided to receive various arrangements of tool bits and spacers so that various profiles may be obtained with the use of these multiple tool bits.

It is another object of the present invention to provide a rotary cutting tool which can accept standard molding cutter blades for use in making molding profiles.

The manner in which these and other objects are acheived by the present invention will become clear from the following detailed description.

DETAILED DESCRIPTION OF THE INVENTION

Figure 1:
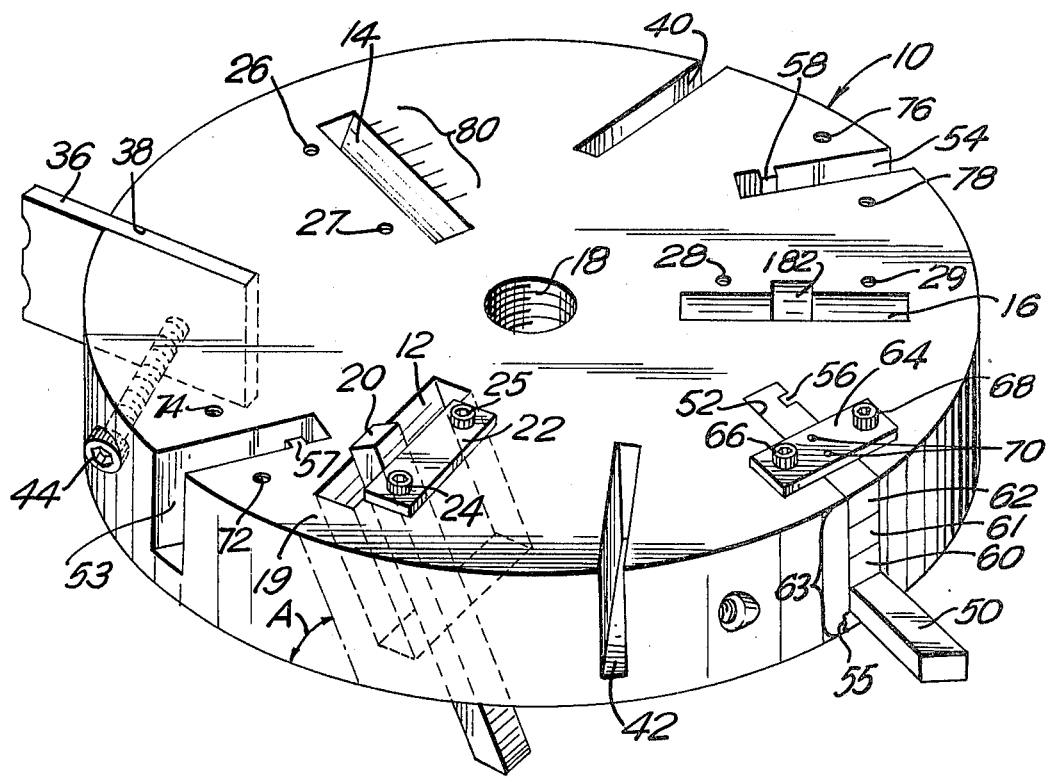
FIG. 1 is a perspective of the upper portion of the inventive tool having three different kinds of cutters installed.

In FIG. 1, the present multiple cutter rotary tool is shown having a main body member 10 into which are formed the various slots needed to accept the different kinds of multiple cutters. The embodiment shown in FIG. 1 employs three slots for each different kind of cutter, however, it should be understood that all that is required is that the slots be symmetrical and, thus, any number of slots may be formed to accommodate any number of cutters. Indeed, a single cutter could be employed provided that proper balance of the tool is obtainable. More specifically, the slots or elongate apertures to retain the axial cutters are shown at 12, 14, and 16. These slots are angularly arranged and go completely through the body 10 in an axial direction but extend in the radial direction less than the total radial distance to the arbor hole 18. An outer wall 19 at least one-eighth inch thick is provided at the outer radial edge of the slot. In an alternate embodiment (not shown) the slot could extend radially outwardly through the rim and a plate attached to the body to prevent the tool bit from escaping the slot.

The top surface of the main body member 10 is planar, however, in order to reduce the weight and to provide clearance for the mounting hardware, the bottom surface, not shown in FIG. 1, is relieved and has a lesser thickness. This will be shown in FIG. 2.

The through slots 12, 14, and 16 are arranged at an angle with the planar surfaces of the body 10. Such angle being shown in relation to slot 12 as angle A. It has been found that a through slot angle of 40 degrees in relation to a plane perpendicular to the axis of rotation provides an advantageous tool retaining angle to eliminate chatter and the like during working of the workpiece. Arranged in each of the slots 12, 14, 16 is a tool bit or tool element. It has been found that standard quarter inch tool steel bits can be advantageously employed. In slot 12, tool bit 20 is retained by means of a retaining plate 22 secured to the body 10 by two socket-head cap screws, 24 and 25. The retaining plate 22 fits into a groove formed in the side of the tool bit 20. This will be shown in more detail hereinafter. Each of the angled longitudinal slots, 14 and 16, are provided with two appropriately arranged tapped holes, 26 and 27, and, 28 and 29, respectively. Such holes are provided to accommodate the mounting screws for the respective retaining plates.

A molding cutter blade 36 is arranged within a slot 38 in the body member 10. Two other slots, 40 and 42, are provided to receive the other molding cutters, not shown. The slots 38, 40, 42 are not precisely radial but are arranged tangentially to a reference circle of preselected diameter concentric with the arbor hole 18. The molding cutters may be suitably retained by means of set screws or socket-head cap screws, which are inserted into tapped holes adjacent the cutter slots. FIG. 1 shows a socket-head cap screw 44 retaining molding cutter 36. Conventional molding cutters have a slot formed in one flat side and the slots 38, 40, 42 can have a spline or key formed therein to accommodate same. Molding cutters also usually have a hole formed in the body thereof and the retaining screw may pass thereinto.

One of the tool bits which could be used to make grooves or slots is shown at 50, inserted in slot 52 in the body 10. Two other slots, symmetrical with slot 52, are provided to receive similar tool arrangements as 50, and such additional slots are shown at 53 and 54. Again, these slots 52, 53, 54 are not precisely radial slots but are arranged tangentially with respect to a reference circle of selected diameter concentric with the arbor hole 18. As may be seen in regard to slot 52, the slot extends approximately half the radius of the body member 10 but does not continue through axially, that is, a portion of the body 10 shown typically at 55 forms a floor against which the tool bit may rest. It is not essential that this floor be integral, and an alternate configuration employing a separate plate affixed to the body could be employed. Each slot 52, 53, 54 has a vertical key or spline 56, 57, 58, respectively, which fits into the grooves formed in the tool bits and serves to retain same.

In the embodiment of FIG. 1, the cutting tool 50 is inserted into slot 52 as are three spacer bars 60, 61, 62 which are generally of a same thickness and width, i.e., the same cross-sectional dimensions, as the cutter member 50. In the embodiment shown in FIG. 1 the total dimensions of the floor 55, the cutter 50, plus the spacer bars 60, 61, 62 will equal the thickness, shown generally at 63, of the body member 10. The spacers 60, 61, 62 and cutter 50 are retained in the slot 52 by means of a retaining plate 64 which is fastened to the top surface of the body 10 by means of two socket-head cap screws, 66 and 68. Each spacer is also formed with a groove like that formed in the cutter that fits into the vertical spline 56. This serves to prevent the cutters and spacers from sliding outwardly. As a further aid in capturing the spacers 60, 61, 62 and cutter 50, small projections may be formed in the bottom surface of the retaining plate 64. While these projections are on the lower side they appear as dimples on the upper surface, as shown generally at 70. The two corresponding slots, 53 and 54, also are provided with tapped holes, 72 and 74, and, 76 and 78, respectively, to accommodate the respective fasteners.

In an embodiment to be discussed hereinbelow, instead of plate 64 being a flat planar element it can be formed in an inverted U-shape, so as to receive an additional cutter element, thereby to provide a different profile. It is understood that by choosing the thickness 63 of the body member 10 and the thickness of the cutters and spacers various numbers of cutters and spacers can be accommodated and, thus, various profile shapes can be formed. This will be seen in more detail hereinbelow. The same one-quarter inch square tool steel bits used for the axial boring and planing may be used in this configuration also. This inverted U-shaped retainer is longer than the plate 64 and is formed having an internal vertical spline corresponding to 56 to interact with the grooves formed in the cutters and spacers.

With respect to the arbor hole 18, this hole may be threaded to accommodate a threaded drive shaft, it may be slotted to accommodate a key, or it can be a smooth bore to fit over a shaft and abut a shoulder, then to be frictionally locked to the shaft by means of internal threads in the shaft. While the particular mounting means is not crucial to the practice of the invention, the rotary tool must be firmly affixed to the driving shaft.

Figure 2:
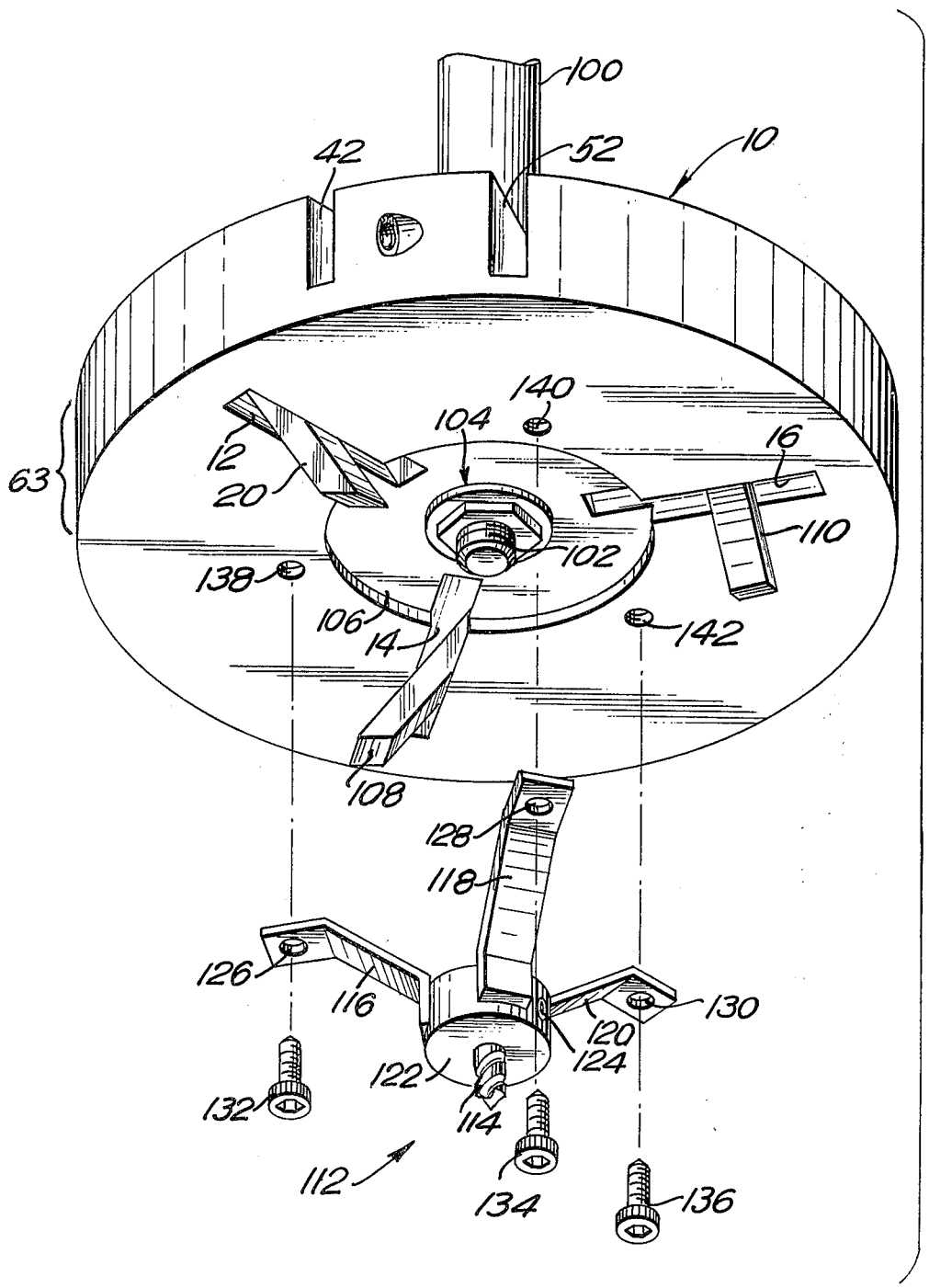
FIG. 2 is a perspective of the bottom portion of the inventive tool having the axial cutting tools installed to provide axial cutting and showing the pilot bit assembly in exploded arrangement therewith.

Referring now to FIG. 2, the embodiment of FIG. 1 is shown from a lower or bottom perspective and the inventive tool is shown containing only those tool bits that perform the axial cutting operation. The other two kinds of cutting elements, which permit the other modes of operation, have been removed. In this view the driving shaft 100 is seen in a truncated form with the lower end 102 thereof threaded, whereby the tool is firmly affixed to the shaft by means of a washer and nut combination 104. Additionally, as seen in this view the hub or inner radial portion 106 of the body 10 is relieved or made a lesser thickness than the body thickness, shown typically at 63, in this manner clearance is provided for the fastener and the end of the shaft. This radially inner portion 106 may be whatever minimum dimension is acceptable to provide sufficient strength, since a savings in gross tool weight is provided by this thinner hub portion.

In addition to tool bit 20 being arranged in slot 12, slots 14, 16 also have tool bits 108, 110 arranged therein, respectively. These tool bits or elements are also captured in their slots by means of retaining plates, which are affixed on the upper surface of the body 10. These retaining plates permit the tool bits 20, 108, 110 to be positioned at any spot along the length of their respective radial slots, thereby permitting circles of different radii to be cut or milled by means of the present invention. Certain of the other slots for the various tool bits are also seen in this view.

Also seen in FIG. 2 is the pilot hole bit assembly 112. As is known when using a rapidly rotating tool having a plurality of bits, such as the present one, it is necessary to provide some guide means to steady the tool in relation to the workpiece, otherwise, the tool will wander and chatter as the initial cut is being made. To solve this problem, the present invention provides a pilot bit assembly 112 having a standard drill bit 114 affixed therein to contact the workpiece before contact is made by the cutting bits 20, 108, and 110. This drill bit 114 steadies the tool in relation to the workpiece as the desired cut is being made. The drill bit 114 can be a standard quarter inch drill bit shortened as necessary. The assembly 112 in this embodiment comprises three legs 116, 118, and 120 attached to a central hub 122 wherein the bit 114 is affixed. A socket-head set screw 124 can be advantageously used to secure the bit 114 in the hub 122. Each leg 116, 118, 120 has a hole 126, 128, 130, respectively formed therein and socket-head cap screws 132, 134, 136 can be used to mount the assembly 112 to the body 10 by cooperating with tapped holes 138, 140, 142 formed in the body 10. The tapped holes 138, 140, 142 can be within the relieved central hub area 106 if desired.

Figure 3:
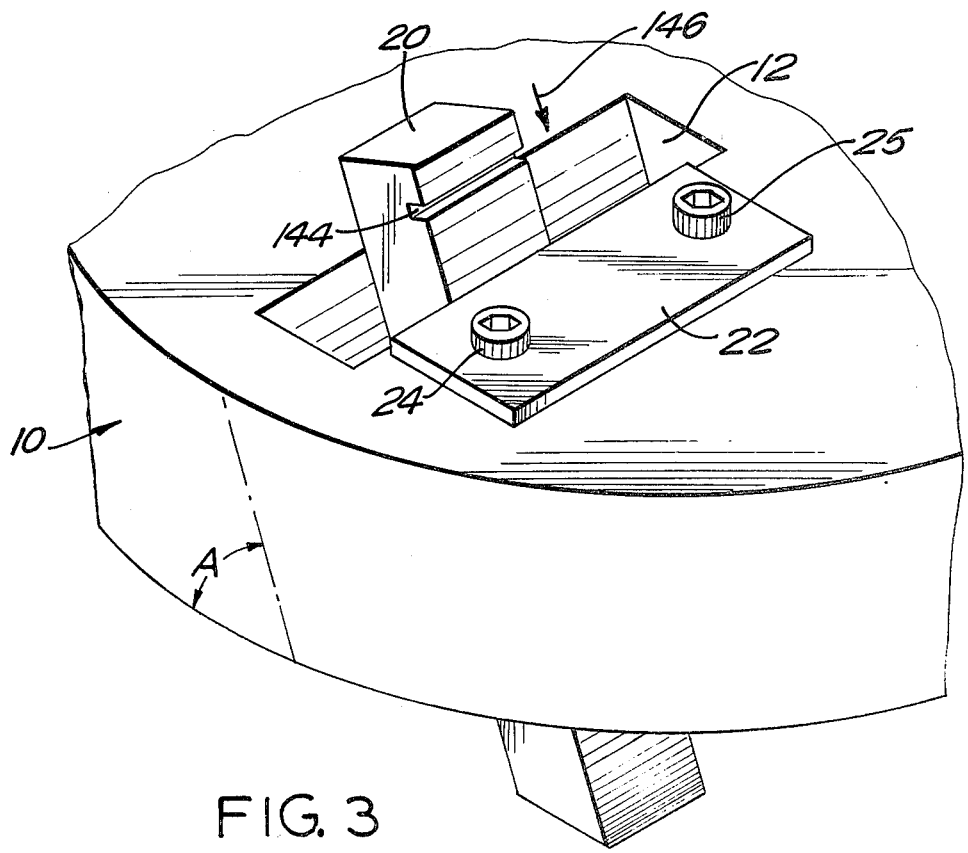
FIG. 3 is a detail in perspective of a portion of the inventive tool showing the means whereby the axial cutters are retained.

FIG. 3 is a detailed showing of the manner in which the vertically arranged cutting bits are captured within their slots. A groove 144, referred to above, is formed in each cutter and the retaining plate 22 locks into this groove. FIG. 3 shows the cutter 20 being inserted into slot 12, as shown by arrow 146, prior to locking down the retaining plate 22. The dimensions of the slot 12, the cutter 20, the retaining plate 22, and the groove 144 are chosen so that when the plate 22 is tightened down the tool is firmly held. Thus, by loosening plate 22 the tool bit 20 can be slid along the slot 12 to control the diameter of the cut being made, or the area being planed.

Figure 4:
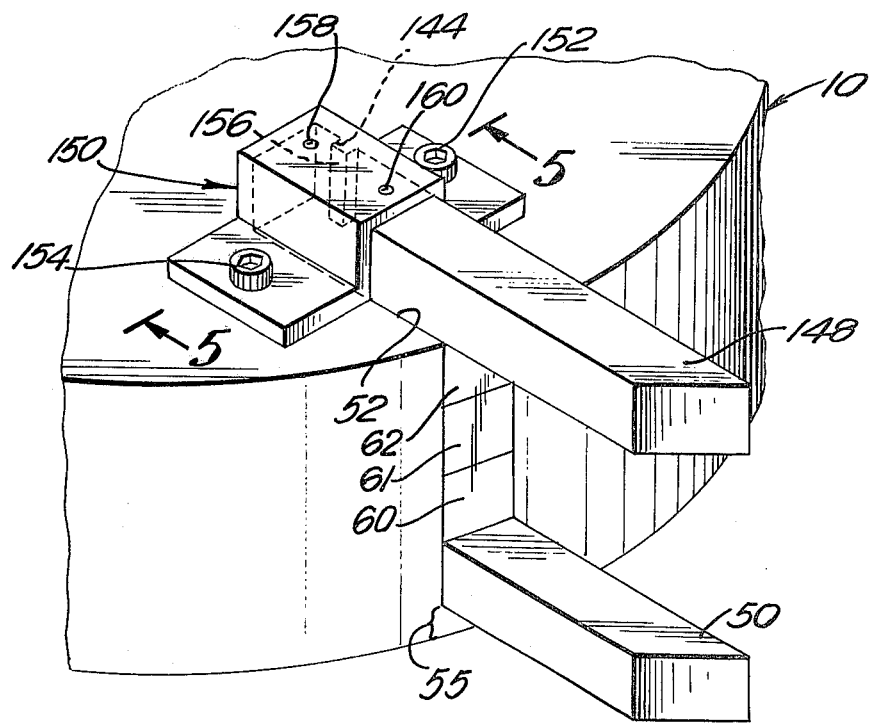
FIG. 4 is a detail in perspective of a portion of the inventive tool showing the manner in which the adjustable radial cutters are retained.

FIG. 4 is a detail perspective showing the cutting tools which extend outwardly from the tool body 10. In this embodiment an integral floor or sole portion 56 is formed in the tool body 10 and against this rests the lower tool element 50. Arranged then in ascending order are the three spacer units 60, 61, and 62 and at the very top is a second cutting element 148. The topmost cutting element 148 is retained in position by the inverted U-shaped clamping element 150 which is fastened to the body 10 by socket-head cap screws, 152 and 154. This clamping element 148 is longer than the plate 64 of FIG. 1 and includes an internal spline or key, shown in phantom at 156, which fits into the groove in the tool, such as 144 in tool 50, to retain the tool. Again, the small dimples corresponding to the protrusions on the inner surface of the inverted U-shaped element are seen at 158 and 160. These protrusions which are not visible in FIG. 4, aid in the capturing of the upper tool bit 148. It is possible by choosing the properly formed tool bit, and by arranging the inventive device at an angle, to make a dovetail groove with two passes of the workpiece. In the embodiment of FIG. 4 the elements are arranged so as to cut two slots into the workpiece when the tool is rotated thereagainst.

It is understood that this embodiment shows space for five separate tool bits and, thus, the tool bits and spacers could be arranged in any order. In the event only one tool bit is employed, then the spacers 60, 61, 62 would be used along with a flat retaining plate, such as 64 of FIG. 1. Similarly, by providing a deeper inverted U-shaped clamping element, additional cutting bits could be placed on top of bit 148. Such deeper inverted U-shaped clamping element would have the internal key or spline to retain the tools and spacers.

Figure 5:
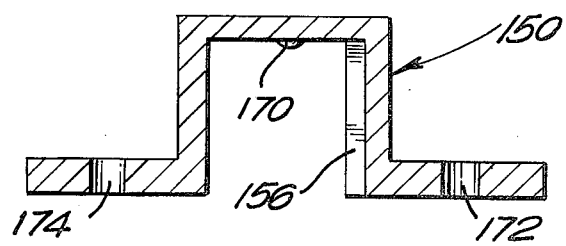
FIG. 5 is a cross section of the cutting bit retainer taken along the line 5.5 in FIG. 4.

FIG. 5 shows the retaining element 150 of FIG. 4 in cross section and in such cross section the protruding result of the depression or dimple 158 is seen at 170. Also seen is the internal key or spline 156 which interacts with the grooves in the tool. FIG. 5 also shows two holes, 172 and 174, to accommodate the socket-head cap screws, 152 and 154. Again, it is pointed out that the internal dimensions defined by the inverted U-shaped element 150 are substantially equal to the cross-sectional dimensions of the tool bit to be employed, e.g., 148 in FIG. 4.

Figure 6:
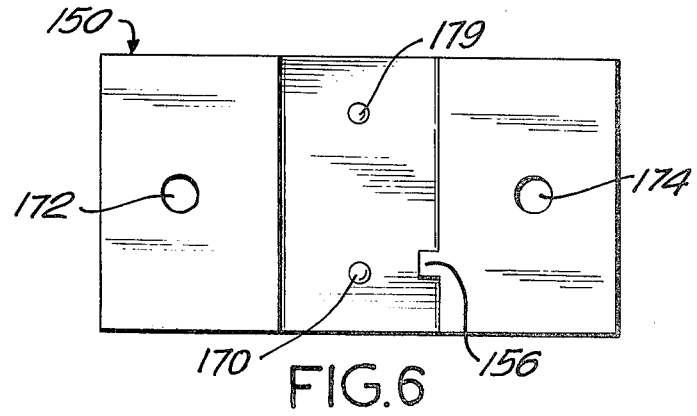
FIG. 6 is a bottom plan view of the cutting bit retainer shown in FIG. 4.

FIG. 6 is a bottom plan view of the inverted U-shaped retainer 150 showing the exact location of the internal key or spline 156. An advantageous design chooses the dimension of the spline 156 from the rear edge of the retainer 150 equal to the dimension from the back of the tool 50 to the slot 144. Also shown in FIG. 6 is a second protrusion 179 for aiding in retaining the tools.

Referring back to FIG. 1, rulings or graduations, shown generally at 180 may be scribed adjacent slots 12, 14, 16 for use in combination with a line scribed on the tool bits for accurate placement of same along the length of the slot.

Also with reference to FIG. 1, in an alternate embodiment in place of making the slot the same width as the tool an additional vertical slot 182 can be provided to permit insertion of oversize tool bits or tool bits having nonuniformly shaped ends. Additionally, a longitudinal slot or groove could be formed internal to slot 12 to interact with a ridge or protrusion on the tool bit to further aid in capturing the tool bit yet permitting radial adjustment.

The operation of the instant device will now be explained in its three separate modes. In the operative mode employing the molding cutters, the assembly is affixed to the arbor or shaft of an appropriate rotary driving machine such as a planer, a table saw, or a radial arm saw. In this mode when the thickness 63 of the tool body 10 permits, radial cutters such as tool 50 can be employed in addition to the molding cutters so that workpieces thicker than the width of the molding cutter can be handled.

When employing the radial cutters, such as 50 in FIG. 1, the tool can be mounted in a table saw or radial arm saw. The particular configuration of bits is first set up and then the tool rotated so as to cut the desired pattern. It is noted that the end of the tool bit 50 can be formed as desired.

Finally, when employing the axial cutters no other cutters should be arranged in the tool for safety purposes, however, such cutters would probably not restrict the cutting ability of the tool. In such case the tool is fastened to the drive shaft of a drill press, milling machine, or a radial arm saw adjusted so as to function as a router. The depth of the cut may be determined by positioning of the bits by means of the retaining plates and the tool rotated and brought into contact with the workpiece. This mode provides boring, milling, and planing of the workpiece.

It is understood of course that the foregoing is set forth by way of example only and is not intended to limit the scope of the present invention, except as set forth in the appended claims.

What is claimed is:

1. A tool for use with a rotary drive for cutting a workpiece, comprising:
   a disc-shaped body having centrally located means for mounting to the rotary drive and defining an axis of rotation;
   a first plurality of elongate (apertures) slots formed substantially radially in said disc-shaped body and passing through from one side to the other side of said disc-shaped body and being adapted for receiving a first tool bit in each of said first plurality of slots;
   each of said first plurality of slots being elongated to have a length substantially greater than a width of said first tool bit to permit said first tool bit to be positioned at preselected points along the length of said first elongate slot;
   a second plurality of slots formed in the rim of the said disc-shaped body pointing generally ouwardly from the center of said disc-shaped body and being adapted for receiving a second tool bit in each slot; and
   a third plurality of slots formed in one side of said body and the rim of said disc-shaped body and not extending through said body and pointing generally outwardly from the center of said body and being adapted for receiving at least one of the first tool bits in each slot, whereby upon said disc-shaped body being mounted to the rotary drive and a first tool bit being arranged in each of said first plurality of slots the tool is adapted for axial cutting and upon a second tool bit being arranged in each of said second plurality of slots, the tool is adapted for radial cutting and upon at least one of the first tool bits being arranged in each of said third plurality of slots the tool is adapted for radial cutting of the workpiece.

2. The tool of claim 1 wherein each of said first plurality of elongate slots is formed at an angle in relation to the axis of rotation of said disc- shaped body.

3. The tool of claim 1 further comprising a first tool bit retaining means affixed to said disc-shaped body proximate each of said first plurality of elongate slots for retaining the first tool bits arranged therein at any point along the length of said first plurality of slots.

4. The tool of claim 1 further comprising second tool retaining means affixed to said disc-shaped body arranged proximate each of said second plurality of slots and being adapted for retaining the second tool bits in said second plurality of slots.

5. The tool of claim 1 further comprising a plurality of spacers for placement within said third plurality of slots in combination with at least one of the first tool bits also being arranged therein, and third retaining means affixed to said disc-shaped body proximate said second plurality of slots for retaining both said spacers and first tool bits in said second plurality of slots.

6. The tool of claim 5 wherein said third retaining means is formed as a flat plate and is affixed to said disc-shaped body by means of screws.

7. The tool of claim 5 wherein said third retaining means is formed as an inverted U-shaped member and arranged above said second plurality of slots for permitting a number of spacers and first tool bits to be arranged within said second plurality of slots in excess of the number permitted by the depth of said third plurality of slots.

8. The tool of claim 7 wherein said third retaining means includes protrusions arranged on the inner surface of said inverted U-shaped member.

9. The tool of claim 1 wherein said disc-shaped body has a central portion having a thickness less than the rim portion of said disc-shaped body.

10. The tool of claim 1 further including a pilot bit means attached to said disc-shaped body on the side opposite the rotary drive, said pilot bit means comprising a drill bit arranged concentrically with said disc-shaped body.

11. A device for attachment to a rotating drive shaft, comprising:
    a flat body member having two flat surfaces and outer peripheral edges and with a central axis of rotation substantially perpendicular to said flat surfaces and having first, second, and third plurality of slots formed therein,
    said first plurality of slots being formed completely through said flat body member from one flat surface to the other flat surface so as to define inner central hub walls and outer rim walls in said flat body member, each of said plurality of slots being of a length to receive cutting tool bits therein at any point along the length of the slot, the tool bits being arranged in substantially the direction of the central axis of rotation,
    said second plurality of slots formed in outer peripheral edges of said flat body member being in spaced-apart relationship with said first plurality of slots arranged radiating outwardly from said central axis of rotation and being adapted to receive molding cutter blades therein,
    said third plurality of slots formed in said outer peipheral edges of said flat body member being in spaced-apart relationship to said first and second plurality of slots arranged radiating outwardly from said central axis of rotation including means to form a floor member for said third plurality of slots and being formed having a depth to receive a plurality of cutting tool bits and bar-shaped spacer means therein arranged parallel to the flat surfaces of said flat body member,
    whereby when tool bits and spacer means are placed in said slots, the device is attached to the rotary drive shaft, and rotated in contact with a workpiece, the workpiece is cut.

12. The device of claim 11 wherein said first plurality of slots are formed at an angle of substantially 40 degrees in relation to a plane perpendicular to the central axis of rotation of said flat body member.

13. The device of claim 11 further comprising a flat tool retaining plate affixed to said flat body member at each of said first plurality of slots for retaining the tool bit in said slot at any point along the length of said slot.

14. The device of claim 11 further including retaining screw means threadedly engaged in said flat body member adjacent said second plurality of slots for retaining said molding cutter blades in said flat body member.

15. The device of claim 11 wherein said bar-spaced spacer means are arranged within said third plurality of slots in combination with the cutting tool bits so as to completely fill each of said third plurality of slots with the combination of cutting tool bits and said spacers and further comprising retaining means affixed to said flat body member for retaining the combination of spacers and cutting tool bits in said flat body member.

16. The device of claim 15 wherein said retaining means is formed as a flat plate.

17. The device of claim 15 wherein said retaining means is formed is an inverted U-shaped member arranged in relation to each of said third plurality of slots so as to permit a number of spacers and cutting tool bits to be mounted in relation to said slot which are greater than the number determined by the depth of the third plurality of slots.

18. The device of claim 11 wherein said flat body member is formed having a area concentric with said central axis of rotation which has a thickness less than the remainder of said flat body member, said area of lesser thickness being arranged on the rotating drive shaft side of said flat body member.

19. The device of claim 11 further including a pilot bit assembly attached to the flat side opposite rotating drive shaft of said flat body member and including a drill bit concentrically aligned with said central axis of rotation.

* * * * *